US007296239B2

(12) United States Patent
Shen et al.

(10) Patent No.: US 7,296,239 B2
(45) Date of Patent: Nov. 13, 2007

(54) SYSTEM GUI FOR IDENTIFICATION AND SYNCHRONIZED DISPLAY OF OBJECT-CORRESPONDENCE IN CT VOLUME IMAGE SETS

(75) Inventors: Hong Shen, Plainsboro, NJ (US); Jianzhong Qian, Princeton Junction, NJ (US); Li Fan, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 494 days.

(21) Appl. No.: 10/090,314

(22) Filed: Mar. 4, 2002

(65) Prior Publication Data

US 2003/0164860 A1    Sep. 4, 2003

(51) Int. Cl.
G06F 15/00 (2006.01)
G06F 13/00 (2006.01)
(52) U.S. Cl. .................... 715/764; 715/732
(58) Field of Classification Search .......... 715/764, 715/767, 850, 852, 781–782, 732, 723, 765, 715/771, 839; 345/424, 429
See application file for complete search history.

(56) References Cited

U.S. PATENT DOCUMENTS 6,058,322 A    5/2000    Nishikawa et al. ......... 600/408
6,597,173 B1 *  7/2003    Bernstein ................... 324/318
6,785,410 B2 *  8/2004    Vining et al. ............... 382/128
6,798,412 B2 *  9/2004    Cowperthwaite ........... 345/428

OTHER PUBLICATIONS

Fan Li et al., "Automatic Segmentation of Pulmonary Nodules by Using Dynamic 3D Cross-correlation for Interactive CAD Systems," *Medical Imaging 2002, XP008022811.*
Ko Jane P. et al., Chest CT : Automated Nodule Detection and Assessment of Change over Time-Preliminary Experience, *Radiology*, 2001 218:267-273 XP-002266047.
International Search Report, Apr. 3, 2003.

* cited by examiner

*Primary Examiner*—Cao (Kevin) Nguyen
(74) *Attorney, Agent, or Firm*—Donald B. Paschburg; F. Chau & Associates LLC

(57) ABSTRACT

Disclosed is a graphical user interface, comprising a plurality of main displays, each for displaying an image set, a user interactive system for receiving from a user a first location of an object-of-interest in one of said image sets, and a correlation system for finding and displaying a second location, corresponding to said first location, of a corresponding second volume-of-interest in at least one of said other image sets.

27 Claims, 3 Drawing Sheets

SYSTEM GUI FOR IDENTIFICATION AND SYNCHRONIZED DISPLAY OF OBJECT-CORRESPONDENCE IN CT VOLUME IMAGE SETS

FIELD OF THE INVENTION

This invention relates to a graphical user interface for object-correspondence identification between computed tomography (CT) volume data sets in general, and to lung nodule-correspondence identification between CT volume data sets in particular.

BACKGROUND OF THE INVENTION

Lung computed tomography (CT) technology has been widely used by physicians in the screening and diagnosis of lung cancer. From lung CT images, the physician can search for nodules and make judgments on their malignancy based on the statistics of the nodules, including shape, size, etc. A very important piece of information is the status change of the nodules over time, such as changes in shape, size, and density. One of the most significant quantitative measurements is the growth rate of lung nodules during a period of time. It is therefore crucial to identify the correspondence of the same nodule in two or more lung CT image sets captured at different time frames.

So far, this task has been done manually, and therefore it is tedious, slow, and error prone because of the tremendous amount of data. Because the CT data are 3D images, the task becomes very difficult for the physician, if at all achievable. In current clinical practice, the physician is required to scan through 2D slices of the 3D image data one by one and try to find the correspondence of a nodule in two image sets. The number of slices for a single data set is as large as several hundreds, and a single slice contains 250,000 pixels. Moreover, the imaging condition for the patient in the CT studies may be varied and the organ and the body may be deformed between two such studies. In many cases, it is hard to tell if a nodule has disappeared after a period of time or still exists because the physician is not able to identify the correspondence between images.

Fast registration of local volumes-of-interest (VOI) from large 3D image data is very often needed in medical image analysis systems, such as the systems for analyzing lung CT images. For example, in the screening and diagnosis of lung cancer, very important pieces of information are the presence of a new nodule, the absence of a previously presented nodule, and the growth rate of a lung nodule. It is therefore crucial to identify the correspondence of the same nodule in two or more lung CT image sets captured at different time frames. In most cases, the properties of the nodule and its surrounding structures are locally distinct, and therefore the registration of local VOI's is sufficient for identifying the correspondence of nodules.

What is needed is a graphical user interface (GUI) that provides convenient examination of two or more image sets allowing the user to immediately identify an object-of-interest on one image set and thereby automatically identifies a corresponding region of interest on the remaining image set by virtue of an automated system that avoids full volume registration, but performs fast and accurate registration of two local VOI's. The GUI should also provide a various set of functions to facilitate examination and comparison, such as synchronized scrolling of the slices in the two data sets.

SUMMARY OF THE INVENTION

Disclosed is a graphical user interface (GUI), comprising a plurality of main displays, each for displaying an image set, a user interactive system for receiving from a user a first location of an object-of-interest in one of said image sets, and a correlation system for finding and displaying a second location, corresponding to said first location, of a corresponding second volume-of-interest in at least one of said other image sets.

In another aspect of the GUI a first volume-of-interest is defined about said first location of said object-of-interest.

In another aspect of the GUI said first and second volumes-of-interest are rendered as Shaded Surface Displays.

In another aspect of the GUI said image sets are rendered as Shaded Surface Displays.

Another aspect of the GUI further comprises displays permitting the user to examine said volumes-of-interest with free viewpoints.

Another aspect of the GUI further comprises one or more data windows for displaying image properties of at least one of said image sets.

Another aspect of the GUI further comprises a lock-scrolling system for synchronized scrolling of two or more image sets.

Another aspect of the GUI further comprises a cartwheel projection system for side-by-side display of two or more cartwheel projection spin windows.

Another aspect of the GUI further comprises a first property display for displaying physical properties of said object-of-interest, a second property display for displaying physical properties of a second object-of-interest located within said second volume-of-interest, and wherein said first and second property displays may be displayed side-by-side.

Disclosed is a program storage device, readable by machine, tangibly embodying a program of instructions executable by the machine to perform method steps for a graphical user interface for an object-correspondence system, said method steps comprising providing a plurality of main displays, each for displaying an image set, receiving from a user a first location of an object-of-interest in one of said image sets, and receiving a second location of a second volume-of-interest from a correlation system, said second location corresponding to said first location.

In another aspect of the storage device a first volume-of-interest is defined about said first location of said object-of-interest.

In another aspect of the storage device said first and second volumes-of-interest are rendered as Shaded Surface Displays.

In another aspect of the storage device said image sets are rendered as Shaded Surface Displays.

Another aspect of the storage device further comprises the function to allow the user to examine said volumes-of-interest with free viewpoints in 3D in synchronization.

Another aspect of the storage device further comprises one or more data windows for displaying image properties of a volume-of-interest at least one of said image sets.

Another aspect of the storage device further comprises machine-readable code for synchronized scrolling of two or more image sets.

Another aspect of the storage device further comprises machine-readable code for side-by-side display of two or more cartwheel projection spin windows.

Another aspect of the storage device further comprises machine readable code for providing a first property display for displaying physical properties of said object-of-interest, providing a second property display for displaying physical properties of a second object-of-interest located within said second volume-of-interest, and displaying said first and second property displays side-by-side.

Disclosed is a method of interfacing graphically with a user for an object-correspondence identification system, comprising the steps of providing a plurality of main displays, each for displaying an image set, receiving from a user a first location of an object-of-interest in one of said image sets, and receiving a second location of a second volume-of-interest from a correlation system, said second location corresponding to said first location.

In another aspect of the method of the invention a first volume-of-interest is defined about said first location of said object-of-interest.

In another aspect of the method of the invention said first and second volumes-of-interest are rendered as Shaded Surface Displays.

In another aspect of the method of the invention said volumes-of-interest are rendered as Shaded Surface Displays.

Another aspect of the method of the invention further comprises providing the function to allow the user to examine said volumes-of-interest with free viewpoint in 3D in synchronization.

Another aspect of the method of the invention further comprises one or more data windows for displaying image properties of at least one of said image sets.

Another aspect of the method of the invention further comprises providing a lock-scrolling system for synchronized scrolling of two or more image sets.

Another aspect of the method of the invention further comprises providing a cartwheel projection system for side-by-side display of two or more cartwheel projection spin windows.

Another aspect of the method of the invention further comprises providing a first property display for displaying physical properties of said object-of-interest, providing a second property display for displaying physical properties of a second object-of-interest located within said second volume-of-interest, and displaying said first and second property displays side-by-side.

DETAILED DESCRIPTION OF PREFERRED EMBODIMENTS

In this invention the identification of object correspondence between two image sets is automated, which makes the procedure more accurate and objective. A graphical user interface (GUI) is provided that can display two or more volume image data sets simultaneously. The physician can use this invention to click on an object in one image set, and the system defines a volume-of-interest around this click point, and then identifies a corresponding volume-of-interest in the other image sets automatically. Because the identification is between two volumes-of-interest abundant with anatomy structures, the user can easily identify the correspondence of objects in these volumes, or confidently decide that an object in the corresponding volume-of-interest has disappeared over the time between two computed tomography (CT) scans. Second, the correspondence identification is real-time, that is, the correspondence of the volume-of-interest is done instantly at the click of the nodule.

The invention is particularly useful for medical imaging, such as tracking lung nodules. Two scans of a patient's lung may be shown side-by-side in the GUI, and when the user clicks on a nodule on one image set, the system then automatically identifies the corresponding location in the remaining image set. The physician can then immediately see whether the nodule is changing, migrating, or has simply vanished. Preferably, the nodules-of-interest with measurements of their properties are also displayed side-by-side.

Figure 1:
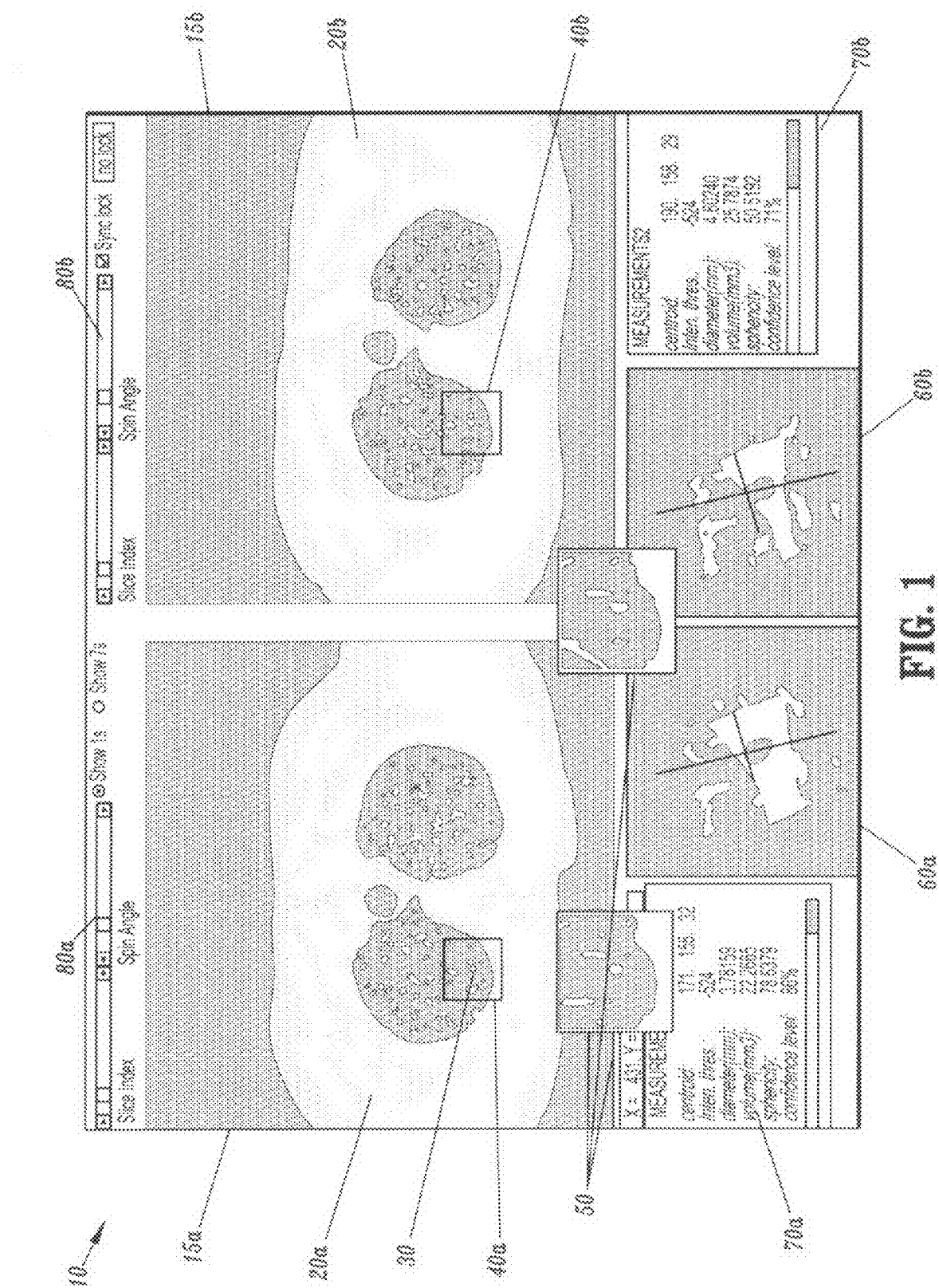
FIG. 1 shows an embodiment of the graphical user interface of the invention.

Referring to FIG. 1, a new GUI 10 is disclosed. The novel GUI 10 is based upon a GUI design from two previously filed commonly assigned U.S. patent applications, namely Novak et al., Interactive Computer-Aided Diagnosis Method and System for Assisting Diagnosis of Lung Nodules in Digital Volumetric Medical Image sets, U.S. Ser. No. 09/840,267, filed Apr. 23, 200 1, and Novak et al., Computer-Aided Diagnosis Method for Aiding Diagnosis of Three Dimensional Digital Image Data, U.S. Ser. No. 09/606,564, filed Jun. 29, 2000, the disclosures of both of which are incorporated by reference herein in their entirety. The GUI disclosed in these patents allows the displaying, scrolling, spinning, and Surface Shaded Display (SSD) rendering of the CT lung image sets. By placing two such GUI's side-by-side and augmenting with now functionality, we construct the novel GUI of this invention.

Using medical imaging as an example, two or more image sets 20 for the same patient are displayed in main display windows 15 for comparison, each representing a patient's lung at different times. The image sets will preferably be three dimensional, meaning the user can scroll through slices of each image set by interactive means, such as by the pressing of the middle button of a mouse and moving the mouse, or other known GUI interactive means. The user can also select an object-of-interest 30 on any image set, and perform spinning 50 or surface rendering 60 on a volume-of-interest (VOI) 40 centered upon the object-of-interest. These functions are provided in the interactive computer-aided diagnosis (ICAD) patents cited above, but now are made available simultaneously for a plurality of image sets, rather than only one. In a preferred embodiment the spin window 50 will pop up when the spin functionality is selected by user, and can be dismissed by user input.

Preferably, the GUI of the invention will provide additional functionality, such as allowing the user to select a lock-scrolling mode. In this mode, when the user scrolls through the slices of one image set, the corresponding slices of the other image set(s) are displayed in the other display window(s). In other words, this invention provides a system for synchronized scrolling of the slices amongst image sets. The invention will preferably also comprise a system to allow two or more cartwheel projection spin windows 50 to be simultaneously displayed side by side, one in each image set, so that the user can adjust the corresponding projection angles of two volumes-of-interest (VOI's). This helps the user to visually compare structures in the two VOI's. Additionally, various displays 70 may be provided upon the screen to indicate useful parameters and measurements, such as the current location of objects-of-interest, the sizes of the objects, growth rate. Here, property displays 70 are shown allowing the user to compare the physical properties of the two objects-of-interest side-by-side. Various controls 80 may be provided to control the slice depth, the rendering of VOI's with free viewpoints, and other displaying features. By "free viewpoints" is meant that the 3D image may be rotated freely, permitting the VOI's to be viewed from any viewpoint, the number of viewpoints being substantially unlimited.

The GUI 10 of the invention possesses a novel core functionality, namely that the selection of an object-of-interest in one image set causes the system to define a volume-of-interest in the remaining image set centered about the location that corresponds to that of the object-of-interest. For example, referring again to FIG. 1, in the main left-hand display window 15a, the user has selected a nodule 30 and a user interactive sub-system has received the user's input and marked out a first volume-of-interest 40a associated with this nodule. The corresponding second volume-of-interest 40b is then automatically identified and marked on the other image set in the upper-right display window by a correspondence identification sub-system. This is achieved by providing the GUI system of the invention with either the exact or estimated location of this position as is disclosed in commonly assigned U.S. patent application Shen et al., Object Correspondence Identification Without Full Volume Registration, Ser. No. 10/071,003, filed Feb. 7, 2002, the disclosures of which are incorporated by reference herein in their entirety. The Shaded Surface Display (SSD) and measurements of two corresponding volumes-of-interest are rendered in the two lower display windows 60a and 60b side-by-side to facilitate user's comparison.

The system will preferably also allow the user to examine the two SSD's with free viewpoints in synchronization to visually compare the properties of the two nodules and VOI's. The surrounding structures will preferably also be displayed to show the validity of the correspondence. The geometric properties of the objects will preferably be displayed in data windows 70 for comparison. Hence, in the example shown where the object-of-interest is a lung nodule, by examining the geometric properties the system can easily compute the growth rate of the nodule over time. If a nodule does not exist in one volume-of-interest, the physician can confidently make the conclusion that it has disappeared rather than not been detected because the surrounding structures show a correct match between the two volumes-of-interest 40.

The correspondence matching will preferably be able to be done in both directions. That is, the user can also click on and select a nodule in the second image set 20b and a volume-of-interest will automatically appear in the first image set 20a.

Figure 2:
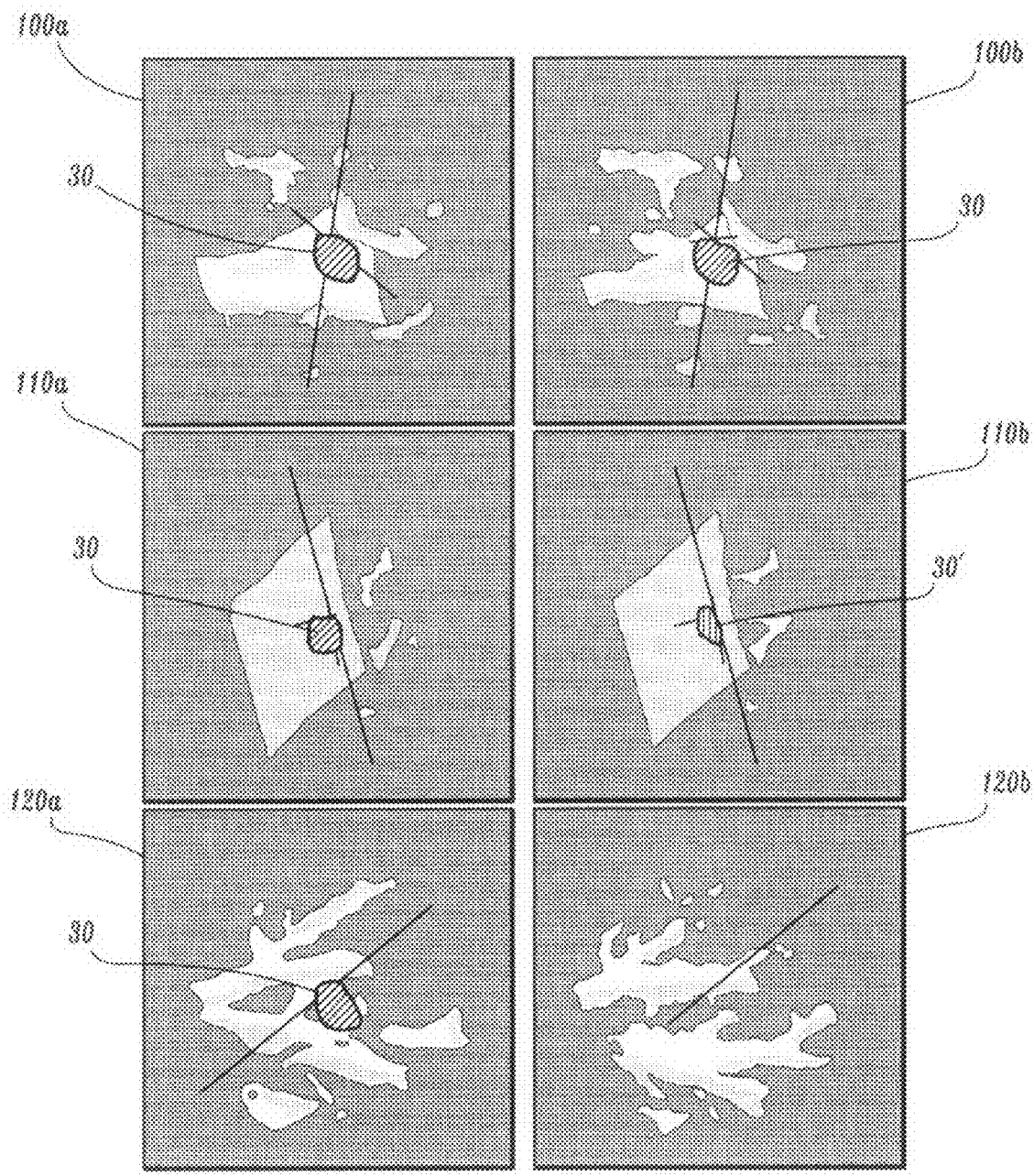
FIG. 2 shows SSD of illustrative detected correspondences.

Referring to FIG. 2, there is shown online-detected correspondences rendered in SSD. Three different cases are shown. In the top row of displays 100, two corresponding nodules 130 are displayed and both are preferably marked in some fashion, such as by a color or by patterning, such as with diagonal lines as shown. This indicates to the user that the software has determined that both objects-of-interest meet the criterion of the object sought after. In our lung example it means that the object meets the criterion of nodules. A growth rate of the nodule can be computed from the volumes of the two corresponding nodules and the time interval. In the second set of displays 110, two corresponding objects 30, 30' are detected, but one of them 30' is marked differently, such as by another color or pattern, such as the vertical lines as shown. This indicates to the user that the software has determined that the second object 30' does not meet the criterion of nodules. In the third pair of images 120 in the bottom row, the object-of-interest 30 has vanished from the VOI on the right. From the surrounding structures we can clearly see the correct correspondence between two VOI's, and we can conclude that the nodule is absent after a period of time.

Figure 3:
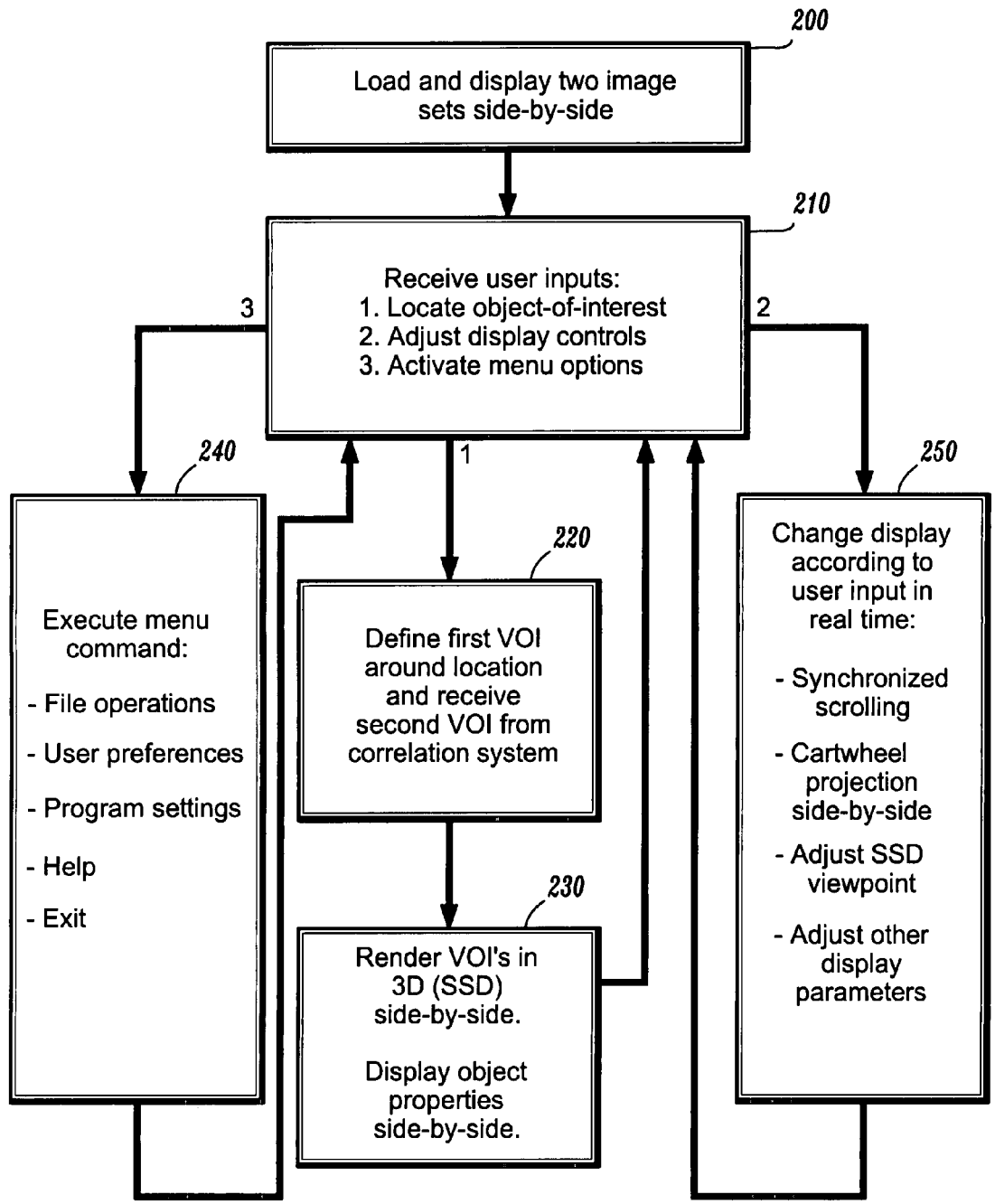
FIG. 3 shows a flowchart of an embodiment of the invention.

FIG. 3 is a flowchart of an embodiment of the invention showing how the command flow of the GUI may be achieved, though of course there are many possible variants of command flow in the programming art. Referring to FIG. 3, we see that the image sets are loaded at 200. This step of loading the image sets could alternatively have been executed from box 240 as a file operation. In flow box 210, the GUI awaits a user command, which may be (1) the clicking on an object-of-interest, (2) a user input for change of display, or (3) a menu option. Box 210 would generally be event driven. The remaining boxes show the flow of execution of commands and return to box 210 as has been described above. Upon option 1, flow goes to box 220 where the correlation system is invoked to locate a corresponding VOI in a second image set. A first VOI is also defined about the first object-of-interest. Flow then goes to box 230 where the VOI's and object properties are displayed before control flow returns to the user at box 210. Upon option 2, any one or more of the display changes described above are executed in real time at box 250 before control returns to the user. Upon option 3, any one of standard or specialized menu operations are executed at box 240, including such familiar operations as file operations (e.g., open file, close file, save file, etc.), user and program preferences and settings, access to a help file, or simply exiting the program.

It is therefore shown that this invention would greatly ease and improve the quality of nodule correspondence identification and henceforth the screening and diagnosis of lung cancer. As the result, the clinical throughput and diagnostic accuracy would be greatly improved.

Though the invention has been described with respect to two image sets, the principles of the invention may easily be extended to any greater number of image sets.

The methods of the invention may be implemented as a program of instructions, readable and executable by machine such as a computer, and tangibly embodied and stored upon a machine-readable medium such as a computer memory device.

It is to be understood that all physical quantities disclosed herein, unless explicitly indicated otherwise, are not to be construed as exactly equal to the quantity disclosed, but rather as about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A graphical user interface, comprising:
a plurality of main displays, each for displaying an image set, said plurality of displays adapted for simultaneously displaying images from different image sets;
a user interactive system for receiving from a user a first location of an object-of-interest in one of said image sets; and a correlation system for finding and highlighting a second location, corresponding to said first location, of a corresponding second volume-of-interest in at least one of said other image sets.

2. The graphical user interface of claim 1 wherein a first volume-of-interest is defined about said first location of said object of interest.

3. The graphical user interface of claim 2 wherein said first and second volumes-of-interest are rendered as Shaded Surface Displays.

4. The graphical user interface of claim 1 wherein said image sets are rendered as Shaded Surface Displays.

5. The graphical user interface of claim 1 further comprising
displays permitting the user to examine said volumes-of-interest with free viewpoints.

6. The graphical user interface of claim 1 further comprising
one or more data windows for displaying image properties of at least one of said image sets.

7. The graphical user interface of claim 1 further comprising
a lock-scrolling system for synchronized scrolling of two or more image sets.

8. The graphical user interface of claim 1 further comprising
a cartwheel projection system for side-by-side display of two or more cartwheel projection spin windows.

9. The graphical user interface of claim 1 further comprising:
a first property display for displaying physical properties of said object-of-interest;
a second property display for displaying physical properties of a second object-of-interest located within said second volume-of-interest; and
wherein said first and second property displays may be displayed side-by-side.

10. A program storage device, readable by machine, tangibly embodying a program of instructions executable by the machine to perform method steps for a graphical user interface for an object-correspondence system, said method steps comprising:
providing a plurality of main displays, each for displaying an image set, wherein said main displays are adapted for the simultaneous display of images from different image sets;
receiving from a user a first location of an object-of-interest in one of said image sets; and
receiving and highlighting a second location of a second volume-of-interest from a correlation system, said second location corresponding to said first location.

11. The storage device of claim 10 wherein a first volume-of-interest is defined about said first location of said object-of-interest.

12. The storage device of claim 11 wherein said first and second volumes-of-interest are rendered as Shaded Surface Displays.

13. The storage device of claim 11 further comprising
machine readable code to allow the user to examine said volumes-of-interest with free viewpoints in 3D in synchronization.

14. The storage device of claim 10 wherein said image sets are rendered as Shaded Surface Displays.

15. The storage device of claim 10 further comprising
one or more data windows for displaying image properties of a volume-of-interest at least one of said image sets.

16. The storage device of claim 10 further comprising
machine-readable code for synchronized scrolling of two or more image sets.

17. The storage device of claim 10 further comprising
machine-readable code for side-by-side display of two or more cartwheel projection spin windows.

18. The storage device of claim 10 further comprising machine readable code for:
providing a first property display for displaying physical properties of said object-of-interest;
providing a second property display for displaying physical properties of a second object-of-interest located within said second volume-of-interest; and
displaying said first and second property displays side-by-side.

19. A method of interfacing graphically with a user for an object-correspondence identification system, comprising the steps of:
providing a plurality of main displays, each for displaying an image set, wherein said main displays are adapted for the simultaneous display of images from different image sets;
receiving from a user a first location of an object-of-interest in one of said image sets; and
receiving and highlighting a second location of a second volume-of-interest from a correlation system, said second location corresponding to said first location.

20. The method of claim 19 wherein a first volume-of-interest is defined about said first location of said object-of-interest.

21. The method of claim 20 wherein said first and second volumes-of-interest are rendered as Shaded Surface Displays.

22. The method of claim 19 wherein said volumes-of-interest are rendered as Shaded Surface Displays.

23. The method of claim 19 further comprising
providing examination of said volumes-of-interest in 3D with free viewpoints in synchronization.

24. The method of claim 19 further comprising
one or more data windows for displaying image properties of at least one of said image sets.

25. The method of claim 19 further comprising
providing a lock-scrolling system for synchronized scrolling of two or more image sets.

26. The method of claim 19 further comprising
providing a cartwheel projection system for side-by-side display of two or mare cartwheel projection spin windows.

27. The method of claim 19 further comprising:
providing a first property display for displaying physical properties of said object-of-interest;
providing a second property display for displaying physical properties of a second object-of-interest located within said second volume-of-interest; and
displaying said first and second property displays side-by-side.

* * * * *